(12) United States Patent
Matsuda

(10) Patent No.: US 7,518,760 B2
(45) Date of Patent: Apr. 14, 2009

(54) IMAGE READING APPARATUS

(75) Inventor: Kohji Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1031 days.

(21) Appl. No.: 10/851,155

(22) Filed: May 24, 2004

(65) Prior Publication Data

US 2005/0157351 A1 Jul. 21, 2005

(30) Foreign Application Priority Data

May 30, 2003 (JP) ............................. 2003-155165

(51) Int. Cl.
*H04N 1/04* (2006.01)
(52) U.S. Cl. ...................... 358/474; 358/496; 358/498; 358/486
(58) Field of Classification Search ................ 358/474, 358/496, 498, 486, 463, 465, 406, 504, 505, 358/448, 488, 461; 382/274; 399/9, 11, 399/16, 17, 361, 362, 365, 381
See application file for complete search history.

(56) References Cited

U.S. PATENT DOCUMENTS

| | | | | |
|---|---|---|---|---|
| 5,317,421 A | * | 5/1994 | Ito | 358/461 |
| 5,347,370 A | * | 9/1994 | Ishihara et al. | 358/461 |
| 5,644,409 A | * | 7/1997 | Irie et al. | 358/461 |
| 5,802,217 A | * | 9/1998 | Suzuki et al. | 382/274 |
| 5,864,408 A | * | 1/1999 | Kumashiro | 358/461 |
| 6,600,579 B1 | * | 7/2003 | Kumagai et al. | 358/474 |
| 6,704,457 B1 | * | 3/2004 | Sugiura | 382/274 |
| 6,801,670 B2 | * | 10/2004 | Kijima et al. | 382/274 |
| 6,891,648 B2 | * | 5/2005 | Inoue et al. | 382/274 |

(Continued)

FOREIGN PATENT DOCUMENTS

JP 6-284284 * 10/1994

(Continued)

OTHER PUBLICATIONS

U.S. Appl. No. 11/280,447, filed Nov. 17, 2005, Matsuda et al.

Primary Examiner—Houshang Safaipour
(74) Attorney, Agent, or Firm—Oblon, Spivak, McClelland, Maier & Neustadt, P.C.

(57) ABSTRACT

A digital copying device, which serves as an image reading apparatus for improving processing speed by adjusting the timing of various operations when reading is performed using a sheet-through system, causes a first traveling body to move beneath a white reference plate in order to read the white reference plate, and then performs an ADF shading operation to move the first traveling body beneath a sheet-through contact glass. The sheet-through contact glass is then subjected to a dirt detection operation by reading a dirt detection reference plate, whereupon an original is conveyed onto the sheet-through contact glass by an ADF to perform a sheet-through reading operation whereby an image of the original is read. When a sheet-through reading operation is to be performed, the sheet-through reading operation is started following the reception of an image reading request and after the elapse of a time (T=Ts+Tl−Td) obtained by subtracting a time Td, which extends from the beginning of the sheet-through reading operation to the point at which the tip of the original reaches a sheet-through reading position, from the sum of a time Ts required for the ADF shading operation and a time Tl required for the dirt detection operation.

6 Claims, 9 Drawing Sheets

U.S. PATENT DOCUMENTS

2004/0179242 A1 * 9/2004 Nakaya .................. 358/461
2005/0083544 A1 * 4/2005 Kondoh .................. 358/461

FOREIGN PATENT DOCUMENTS

| JP | 8-9116 | * | 1/1996 |
| JP | 2001-53938 | * | 2/2001 |
| JP | 2003-008849 | | 1/2003 |
| JP | 2003-008850 | | 1/2003 |

* cited by examiner

IMAGE READING APPARATUS

BACKGROUND OF THE INVENTION

1. Field of the Invention

The present invention relates to an image reading apparatus, and more particularly to an image reading apparatus which reads an original using either a sheet-through-type or book-type original reading system by performing shading correction based on a white reference plate, and which increases the processing speed by adjusting the timing of various operations when reading is performed using the sheet-through system.

2. Description of the Background Art

In an image reading apparatus such as a copying device or scanner, a so-called book system and a so-called sheet-through system are used as systems for reading an original image. In a book system image reading apparatus, an original placed on a contact glass is held in place by a platen, and a white reference plate provided on the surface of the platen on the contact glass side is read in order to correct the gain of a signal processing unit and generate shading data. An image of the original is then read while moving an image reading portion carried on a moving traveling body over the original, and thus high-precision image reading is performed. In a sheet-through system image reading apparatus, an original image is read by moving the original while a fixed exposure scanning unit does not move.

In an image reading apparatus which is capable of performing reading using both the book system and the sheet-through system, a so-called sheet-through-type document feeder (automatic original conveyance mechanism) comprising an original placing portion on which a plurality of originals is placed, a conveying portion for conveying the originals on the original placing portion sheet by sheet, and a sheet-through contact glass provided between the conveyed original and the exposure scanning unit is provided so that a plurality of originals can be read efficiently. When reading is performed using the sheet-through system, to ensure that the correction amount is equal to that of the book system, the white reference plate is read by moving the exposure scanning unit carried on the traveling body between the white reference plate and the sheet-through contact glass, thus correcting the gain of the signal processing unit and generating shading data, whereupon the exposure scanning unit is moved to the position of the sheet-through contact glass, and an image of the original conveyed by the document feeder is read by the exposure scanning unit through the sheet-through contact glass. Thus image reading is performed with high precision.

Further, in the case of the sheet-through system, the original comes into contact with the sheet-through contact glass, and hence the sheet-through contact glass may become dirty. This dirt may appear on the read image as a line in the reading direction at the soiled part. Hence, in order to reduce the occurrence of lined images caused by dirt on the sheet-through contact glass in conventional sheet-through system image reading apparatuses, several lines of a dirt reference plate positioned on the upper face of the sheet-through contact glass are read following shading processing, and when dirt is detected from the image data obtained when this dirt reference plate is read, correction processing is typically performed.

However, in an image reading device that is capable of reading using both the sheet-through system and book system, when reading is performed using the sheet-through system by conveying a plurality of originals through a document feeder sheet by sheet, a process whereby the traveling body loaded with the exposure scanning unit is moved to the position of the white reference plate to read the white reference plate, and then returned to the sheet-through contact glass position, which is the original reading position, to read several lines of the dirt reference plate in order to detect dirt must be performed every time an original is read. As a result, the processing routine cannot advance to reading of the next original until shading correction and dirt detection are complete, leading to a corresponding deterioration in the image reading productivity (number of originals read per hour).

To solve this problem, it is possible to reduce the time required for shading by increasing the speed at which the traveling body loaded with the exposure scanning unit moves to the white reference plate and returns to the reading position, but if this speed is increased excessively, positional deviation and so on of the exposure scanning unit become more likely to occur, and hence there are limitations thereon as a mechanical operation.

Hence a conventional image processing apparatus has been proposed in Japanese Unexamined Patent Application H6-284284. This image processing apparatus comprises: reading means for reading an original image in line units, these means having a light source and a one-line light-receiving element; moving means for moving the reading means from a white reference set position, at which a white reference value for shading correction is set, to an original reading position at which the original image is read; a main white reference plate facing all of the light-receiving elements of the reading means set in the white reference set position; a sub white reference plate facing an end portion light-receiving element of the reading means set in the original reading position; original conveying means for conveying a plurality of originals in succession such that the remaining light-receiving elements of the reading means set in the original reading position read the original image; and processing means for retrieving from the main white reference plate in the white reference set position an amount of light entering each light-receiving element of the reading means as a white reference value, retrieving from the sub white reference plate in the reading position an amount of light entering the end portion light-receiving element of the reading means every time an original image is read, and modifying each white reference value of the light-receiving elements in accordance with the ratio of the light amount entering the end portion light-receiving element in the white reference set position and the original reading position.

Further, a conventional image reading apparatus has been proposed in Japanese Unexamined Patent Application H8-9116. This image reading apparatus has a first original reading mode in which an original image is read by having an optical system scan an original placed on an original table, and a second original reading mode in which the original image is read with the optical system stopped in a specific position while the original is conveyed by original conveying means, original images read in both modes being subjected to photoelectric conversion from an optical signal to an electric signal using a photoelectric conversion element. The image reading apparatus comprises a first white reference plate serving as a white reference of the first original reading mode, and a second white reference patch serving as a white reference of the second original reading mode. Shading correction in the first original reading mode and shading correction in the second original reading mode are both performed on the basis of shading waveforms obtained by reading a common white reference plate.

These prior art examples both perform correction on the basis of values corrected by a white reference plate, using a sub reference plate each time reading is performed.

A further image reading apparatus has been proposed in Japanese Unexamined Patent Application 2001-53938. This image reading apparatus comprises an exposure optical system for reading an original that is conveyed over a platen at a fixed speed, a shading plate for correcting the white reference of the read image information, a traveling body for moving the reading position of the optical system in order to read the shading plate using the exposure optical system, and control means for performing a shading operation by moving the traveling body to the position of the shading plate both before and after the original is read.

In this type of conventional image reading apparatus, however, improvements are required in the efficiency and quality with which images are read. More specifically, in the prior art of Japanese Unexamined Patent Application H6-284284 described above, the sub reference plate is provided in only one part outside of the reading range, and hence irregularities in the main scanning direction cannot be corrected accurately. In the prior art of Japanese Unexamined Patent Application H8-9116 described above, irregularities in the main scanning direction can be corrected, but since a mirror must be driven, a mechanical operation in which the mirror is moved to the direction in which the sub reference plate is read and then returned to its state during original reading is required, and hence there are limitations on the extent to which the processing time can be shortened.

In the prior art of both Japanese Unexamined Patent Application H6-284284 and Japanese Unexamined Patent Application H8-9116, two white reference plates are provided, and as a result of this increase in the number of white reference plates to be read, deviations occur from the original correction values.

In the prior art in Japanese Unexamined Patent Application 2001-53938, a shading operation is taken into consideration, but the time required for the original to move from the standby position to the reading position is not considered, and hence it may be impossible to achieve the intended effects due to the reading speed of the document feeder. Hence improvements are needed.

SUMMARY OF THE INVENTION

It is therefore an object of the present invention to provide an image reading apparatus which performs a sheet-through reading operation, shading, and dirt detection reading efficiently and accurately by adjusting the timing thereof appropriately, and which improves the productivity of original image reading by shortening the reading interval of each original while improving the quality of the read images.

In accordance with the present invention, an image reading apparatus comprises a book platen on which an original is placed fixedly, a sheet-through platen onto which a plurality of originals placed on an original table are conveyed sheet by sheet by an original conveying device, an exposure scanning device disposed beneath said book platen and the sheet-through platen so as to be capable of movement in a sub scanning direction, which moves beneath the book platen in the sub scanning direction in order to read an original placed fixedly on the book platen, and is fixed beneath the sheet-through platen in order to read an original that is conveyed onto the sheet-through platen, a white reference plate for providing shading correction data, and a dirt detection plate disposed facing the sheet-through platen, which is read by the exposure scanning device when no original is present on the sheet-through platen to provide detection data for detecting the presence of dirt on the sheet-through platen.

The image reading apparatus performs original reading using either a book system in which an image of the original placed on the book platen is read by having the exposure scanning device move to scan the original, or a sheet-through system in which the exposure scanning device are moved to a sheet-through reading position beneath the sheet-through platen, and an image of the original that is conveyed onto the sheet-through platen by the original conveying device is read by scanning the original using said exposure scanning device fixed in the sheet-through reading position.

The white reference plate is read each time an original is read, regardless of the reading system that is used to read the original, whereupon image data obtained upon the reading of the original are subjected to shading correction based on shading correction data obtained when the white reference plate is read.

When an image of an original is to be read using the sheet-through system, upon reception of an image reading request, the exposure scanning device is moved to a white reference plate reading position for reading the white reference plate, whereby the white reference plate is read by the exposure scanning device to obtain shading correction data, whereupon a sheet-through shading operation is performed to move the exposure scanning device to the sheet-through reading position beneath the sheet-through platen, whereupon a dirt detection operation for detecting the presence of dirt on the sheet-through platen is performed by having the exposure scanning device, having moved to the sheet-through reading position, read the dirt detection plate, whereupon the original conveying device are driven to convey a single original from the original table onto the sheet-through platen in order to perform a sheet-through reading operation whereby an image of the original conveyed onto the sheet-through platen is read using the exposure scanning device fixed in the sheet-through reading position.

When an original is to be read using the sheet-through system in accordance with the image reading request, the sheet-through reading operation is begun by the original conveying means after the elapse of a standby time $T=Ts+Tl-Td$, where Ts is a time required for the sheet-through shading operation, Tl is a time required for said dirt detection operation, and Td is a time required to convey the original from the start of the said sheet-through reading operation by the original conveying means to the time when a tip of the original reaches the sheet-through reading position, following reception of the image reading request.

BRIEF DESCRIPTION OF THE DRAWINGS

The above and other objects, features, and advantages of the present invention will become more apparent from the following detailed description taken with the accompanying drawings in which:

FIG. 7 is a timing chart showing the timing of a reading operation performed by the digital copying device from a second sheet onward when a plurality of sheets is read in series during reading at a high resolution or the like;

DESCRIPTION OF THE PREFERRED EMBODIMENT

A preferred embodiment of the present invention will now be described in detail on the basis of the attached drawings.

Figure 1:
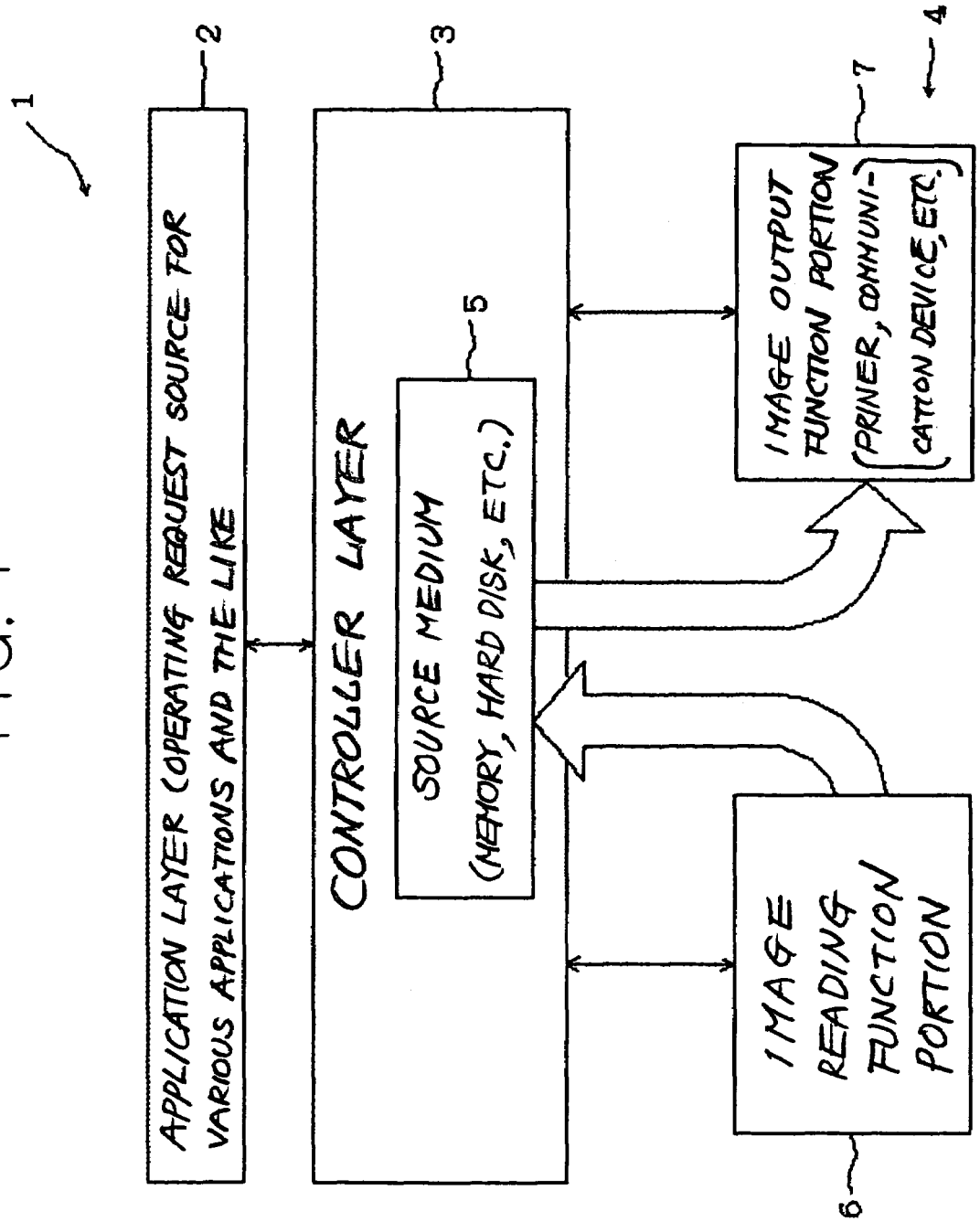
FIG. 1 is a block diagram showing the system configuration of a digital copying device to which an embodiment of an image reading apparatus of the present invention is applied.

FIGS. 1-9 are views showing an embodiment of the image reading apparatus of the present invention. FIG. 1 shows the system configuration of a digital copying device 1 to which this embodiment is applied.

In FIG. 1, the digital copying device 1 of this embodiment is constituted by an application layer 2 comprising various applications and the like which issue operating requests, a controller layer 3 which receives the operating requests from the application layer, issues operating requests to various devices, and manages the various devices, and a device layer 4 which receives the operating requests from the controller layer 3 and performs actual operations. The controller layer 3 comprises a storage medium 5 such as memory or a hard disk for storing images and the like, and an image recording control portion (not shown in the drawing) for controlling the storage medium 5. The device layer 4 comprises an image reading function portion 6 and an image output function portion 7.

In this digital copying device 1, when a reading start button, for example, is depressed on an operating portion not shown in the drawing, the application layer 2 issues an image reading request to the controller layer 3. The controller layer 3 receives the image reading request from the application layer 2, and instructs the image reading function portion 6 to perform calculations for performing the requested reading operation and reading preparation such as register setting. Simultaneously, the controller layer 3 transmits a request to the image recording control portion to prepare the storage medium 5, such as the memory or hard disk, for storing the read image data. When the image reading function portion 6 and storage medium 5 enter a state in which reading can be begun, the controller layer 3 is informed that preparation is complete.

Having received notification that the image reading function portion 6 and storage medium 5 are prepared, the controller layer 3 issues a reading start request to the image reading function portion 6. When a reading start request is issued from the controller layer 3, the image reading function portion 6 receives the reading start request, and performs actual reading of an original image. The read image data is then transferred to the storage medium 5 in the controller layer 3.

When transfer of the image data from the image reading function portion 6 is complete, the controller layer 3 issues an output request, if necessary, to the image output function portion 7. Having received the output request from the controller layer 3, the image output function portion 7 outputs the image data stored in the storage medium 5 to a recording medium such as transfer paper.

Figure 2:
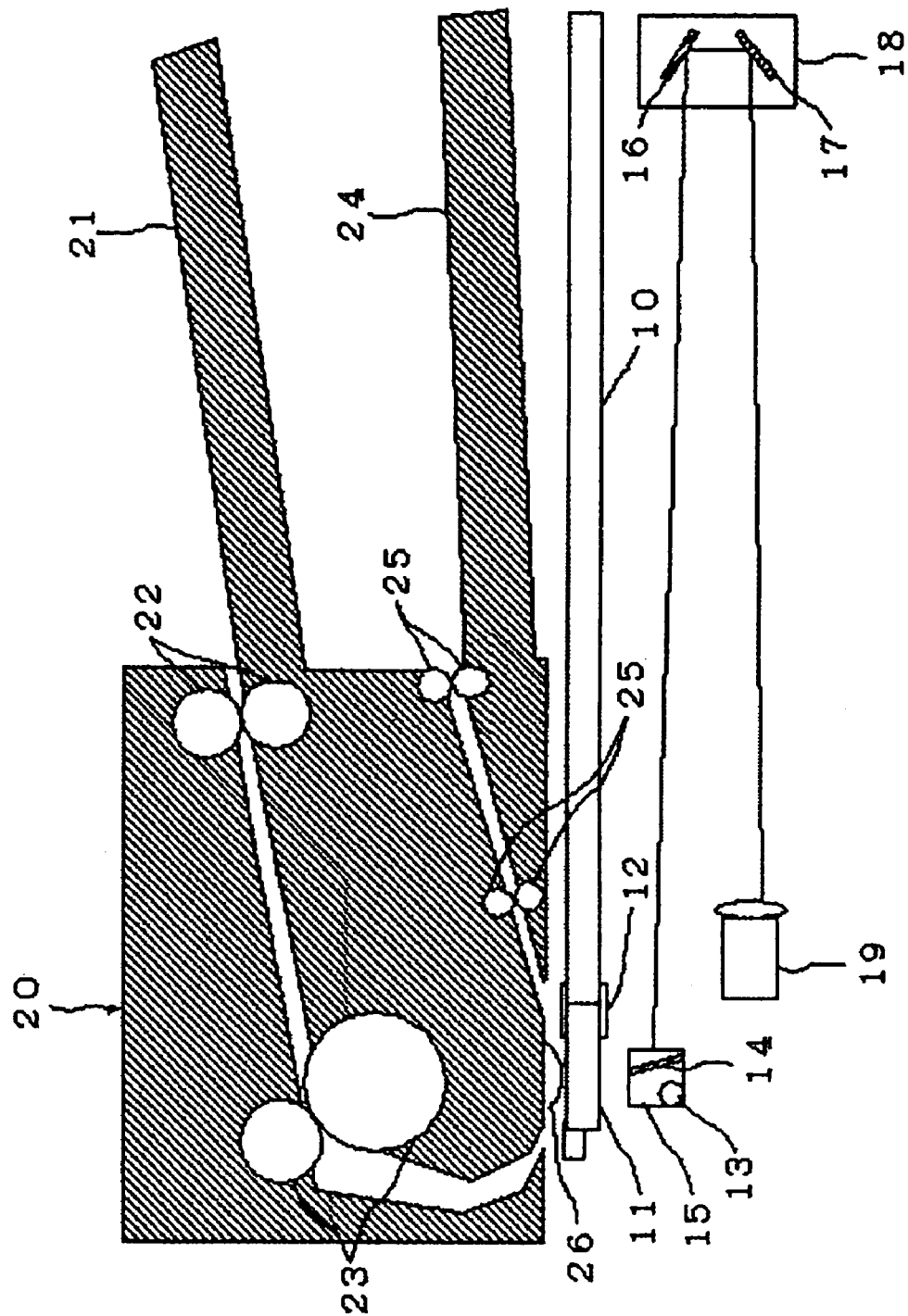
FIG. 2 is a front sectional view showing the configuration of the main parts of the image reading apparatus.

As shown in FIG. 2, in the image reading function portion 6 described above, a book read contact glass (book platen) 10 and a sheet-through contact glass (sheet-through platen) 11 are arranged in series on the upper portion of a main casing, and a white reference plate 12 is provided on the inside face of the main casing between the book read contact glass 10 and sheet-through contact glass 11. A first traveling body 15 carrying a lamp 13 and a first mirror 14, a second traveling body 18 carrying a second mirror 16 and a third mirror 17, a lens not shown in the drawing, and a read scanning unit (exposure scanning means) such as a CCD (Charge Coupled Device) 19 are provided in the main casing below the book read contact glass 10 and sheet-through contact glass 11, and an ADF (Auto Document Feeder) 20 is provided as original conveying means in the upper portion of the main casing 2.

The ADF 20 comprises a platen (original table) 21 on which a plurality of originals is placed, a paper-feeding roller 22 for dividing the plurality of originals on the platen 21 into single sheets and dispatching the sheets, a guide roller 23 for conveying the original dispatched by the paper-feeding roller 22 onto the sheet-through contact glass 11, a paper-discharging roller 25 for discharging the read original onto an original recovery table 24, a dirt detection reference plate (dirt detection plate) 26 disposed facing the sheet-through contact glass 11, and so on.

Although not shown in the drawing, the image reading function portion 6 is also provided with a scanner motor for moving the first traveling body 15 and second traveling body 18 in a sub scanning direction, a home position sensor for detecting the home position of the first traveling body 15 and second traveling body 18, an original detection sensor for setting the original and detecting the conveyance position of the original, and so on.

The image reading function portion 6 irradiates an original on the book read contact glass 10, an original on the sheet-through contact glass 11, and the white reference plate 12 with light from the lamp 13 carried on the first traveling body 15, whereupon the light that is reflected by the original or white reference plate 12 is reflected by the first mirror 14 on the first traveling body 15 and the second mirror 16 and third mirror 17 on the second traveling body 18 in succession, and thus enters the lens. The lens forms the incident light into a reduced image on the CCD 19, and the CCD 19 subjects the incident light to photoelectric conversion.

The surface of the white reference plate 12 which is irradiated with the light is white, and thus the white reference plate 12 provides shading correction data for correcting various strains caused by the reading optical system.

The image reading function portion 6 then reads the original using a system selected from the book system and the sheet-through system. In the book system, the image reading function portion 6 irradiates the original set on the book read contact glass 10 with light from the lamp 13 carried on the first traveling body 15 while moving the first traveling body 15 and second traveling body 18 over the original set on the book read contact glass 10 in the sub scanning direction, whereupon the light that is reflected by the original is reflected by the first mirror 14 on the first traveling body 15 and the second mirror 16 and third mirror 17 on the second traveling body 18 in succession, and is condensed in the CCD 19 via the lens. The incident light is then subjected to photoelectric conversion by the CCD 19, and thus an image of the original is read. At this time, the image reading function portion 6 drives the first traveling body 15 and second traveling body 18 such that the second traveling body 18 is driven at half the speed of the first traveling body 15, whereby the first traveling body 15 and second traveling body 18 have a speed ratio of 2:1. When reading an original using the book system, the image reading function portion 6 moves the first traveling body 15 and second traveling body 18 prior to reading of the original such that the reading position is set at a white reference plate reading position P2 shown in FIG. 3. The white reference plate 12$^i$ is then read, and the image data obtained upon reading of the white reference plate 12 are stored in the memory as shading correction data. Thus the image data obtained upon reading of the original are subjected to shading correction on the basis of the shading correction data stored in the memory.

Figure 3:
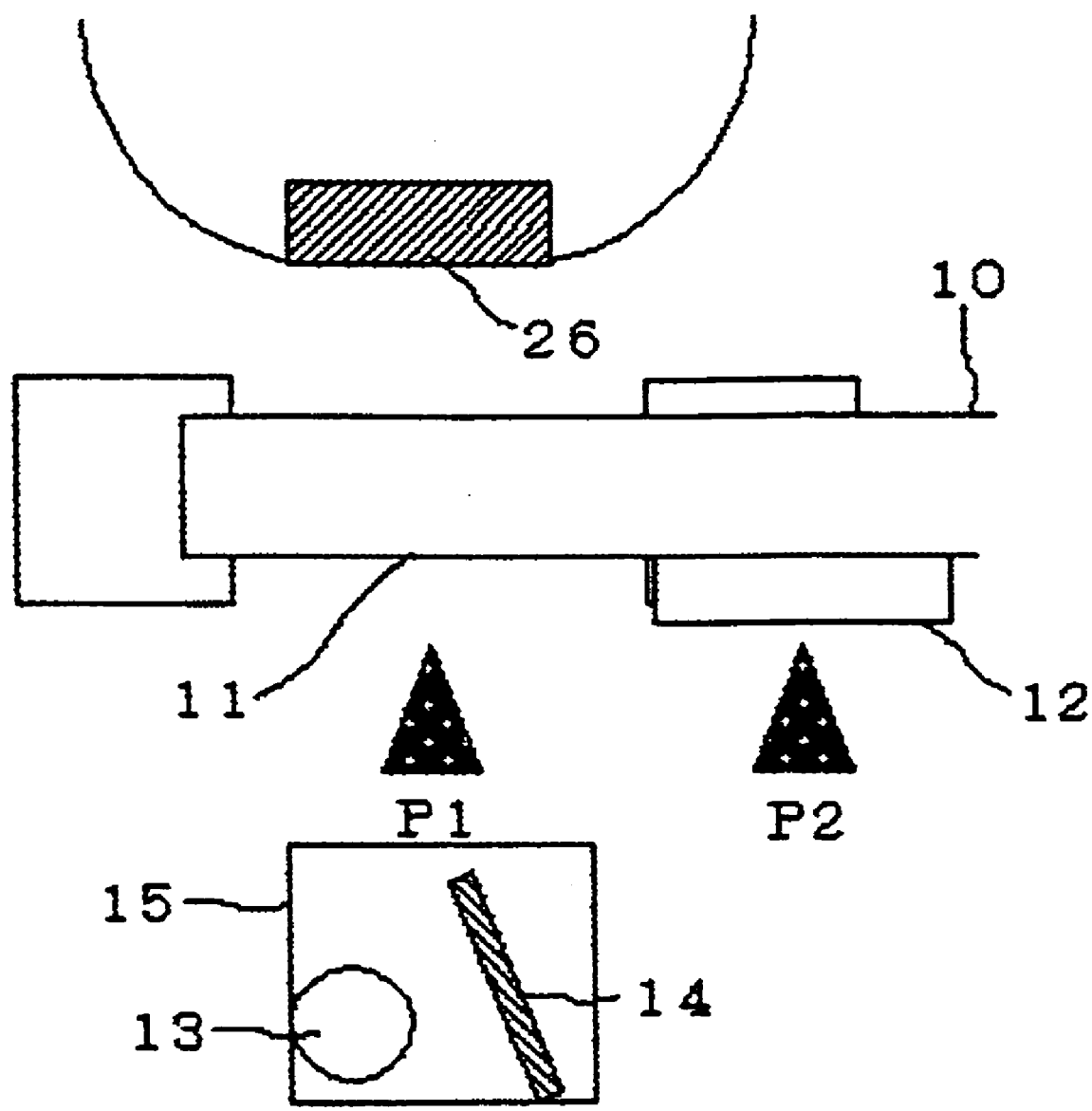
FIG. 3 is a front view showing an enlargement of a sheet-through contact glass and a white reference plate part of the image reading apparatus.

In the sheet-through system, the image reading function portion 6 moves the first traveling body 15 to a sheet-through reading position P1 directly beneath the sheet-through contact glass 11, as shown in FIGS. 2 and 3, and moves the second traveling body 18 to a position further to the right side than the first traveling body 15, whereupon the plurality of originals placed on the platen 21 of the ADF 20 are conveyed sheet by sheet between the sheet-through contact glass 11 and the dirt detection reference plate 26. The original conveyed over the sheet-through contact glass 11 is thus irradiated with light from the lamp 13 carried on the first traveling body 15, whereupon the light that is reflected by the original is reflected by the first mirror 14 on the first traveling body 15 and the second mirror 16 and third mirror 17 on the second traveling body 18 in succession, and this light is condensed in the CCD 19 via the lens. The incident light is then subjected to photoelectric conversion by the CCD 19, and thus an image of the original is read.

Also in the sheet-through system, before reading the original, the image reading function portion 6 first moves the first traveling body 15 and second traveling body 18 such that the reading position moves to the white reference plate reading position P2 shown in FIG. 3, reads the white reference plate 12, and stores the image data obtained upon reading of the white reference plate 12 in the memory as shading correction data. The image reading function portion 6 then performs a series of ADF shading operations (sheet-through shading operations) to return to the sheet-through reading position P1, whereupon several lines of the dirt detection reference plate 26 are read in the sheet-through reading position P1 to perform a dirt detection operation whereby dirt on the sheet-through contact glass 11 is detected on the basis of the image data obtained upon reading of the dirt detection reference plate 26. The ADF 20 is then driven to begin conveying the original, and thus a sheet-through reading operation is begun in order to read the original as it passes over the sheet-through contact glass 11. The image data obtained upon reading of the original are then subjected to shading correction on the basis of the shading correction data stored in the memory.

As described above, in both the book system and the sheet-through system, the image reading function portion 6 reads the same white reference plate 12 to obtain shading correction data, and uses these shading correction data to perform shading correction. Hence there is no difference in image quality whether reading is performed using the book system or the sheet-through system.

Next, the actions of this embodiment will be described. The digital copying device 1 of this embodiment is capable of reading an original using the image reading function portion 6 in either the book system or the sheet-through system. However, to ensure that there is no difference in image quality regardless of whether reading is performed using the book system or the sheet-through system, shading correction is performed in both the book system and the sheet-through system on the basis of shading correction. data that are obtained when the same white reference plate 12 is read.

More specifically, when an original is to be read using the book system, the image reading function portion 6 moves the first traveling body 15 and second traveling body 18 before reading the original such that the reading position is moved to the white reference plate reading position P2 shown in FIG. 3, reads the white reference plate 12, and stores the image data obtained upon reading of the white reference plate 12 in the memory as shading correction data. The image data obtained upon reading of the original are then subjected to shading correction on the basis of these shading correction data stored in the memory.

When an original is to be read using the sheet-through system, the image reading function portion 6 moves the first traveling body 15 and second traveling body 18 before reading the original such that the reading position is moved to the white reference plate reading position P2 shown in FIG. 3, reads the white reference plate 12, and stores the image data obtained upon reading of the white reference plate 12 in the memory as shading correction data. The image reading function portion 6 then performs a series of ADF shading operations to return to the sheet-through reading position P1, whereupon several lines of the dirt detection reference plate 26 are read in the sheet-through reading position P1 to perform a dirt detection operation whereby dirt on the sheet-through contact glass 11 is detected on the basis of the image data obtained upon reading of the dirt detection reference plate 26. The ADF 20 is then driven to begin conveying the original, and thus a sheet-through reading operation is begun in order to read the original as it passes over the sheet-through contact glass 11. The image data obtained upon reading of the original are then subjected to shading correction on the basis of the shading correction data stored in the memory.

Also in the digital copying device 1, as described above, when a reading start button on an operation portion not shown in the drawing is depressed, for example, the application layer 2 issues an image reading request to the controller layer 3. The controller layer 3 receives the image reading request from the application layer 2, and instructs the image reading function portion 6 to perform calculations for performing the requested reading operation and reading preparation such as register setting. Simultaneously, the controller layer 3 transmits a request to the image recording control portion to prepare the storage medium 5, such as the memory or hard disk, for storing the read image data.

When the image reading function portion 6 and storage medium 5 enter a state in which reading can be begun, the controller layer 3 is informed that preparation is complete. Having received notification that the image reading function portion 6 and storage medium 5 are prepared, the controller layer 3 issues a reading start request to the image reading function portion 6.

When a reading start request is issued from the controller layer 3, the image reading function portion 6 receives the reading start request, and performs actual reading of an original image. The read image data is then transferred to the storage medium 5 in the controller layer 3. When transfer of the image data from the image reading function portion 6 is complete, the controller layer 3 issues an output request, if necessary, to the image output function portion 7. Having received the output request from the controller layer 3, the image output function portion 7 outputs the image data stored in the storage medium 5 to a recording medium such as transfer paper.

Also in the digital copying device 1, when a reading request for the next original is issued during reading in the sheet-through system, the image reading function portion 6 performs an ADF shading operation in order to read the next original immediately after reading of the current original is complete. From the second original onward when a plurality of originals placed on the platen 21 of the ADF 20 are read in series, the image reading function portion 6 receives a reading start request from the controller layer 3, and then performs shading correction using the shading correction data obtained by the ADF shading operation performed directly before receiving the reading start request, or in other words directly after reading of the current original is complete.

Figure 4:
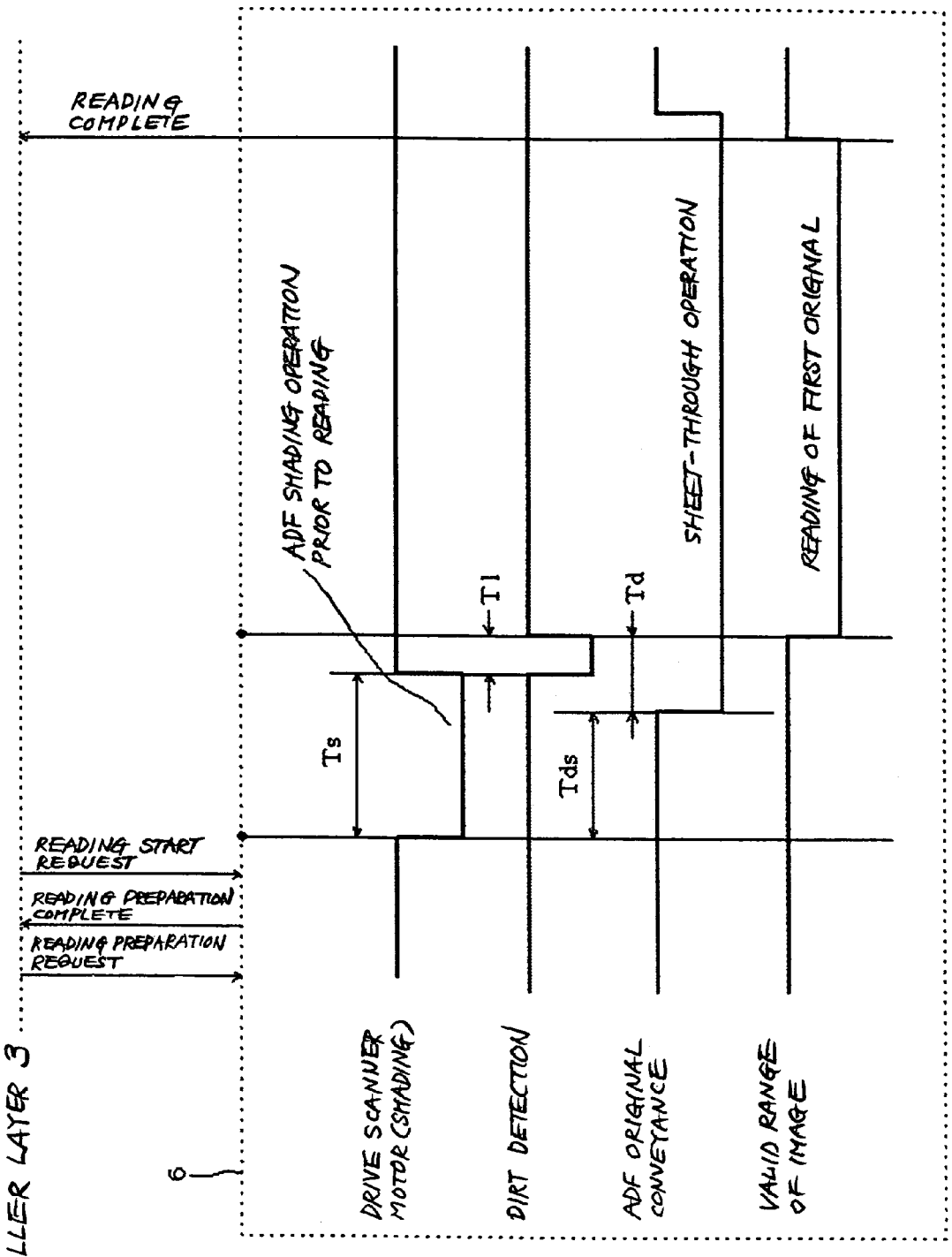
FIG. 4 is a timing chart showing the timing of a reading operation performed by the digital copying device.

Also in the digital copying device 1, processing speed is improved by adjusting the operation timing of the sheet-through reading operation, in which original conveyance is activated by the image reading function portion 6 such that an image of the original is read, as shown in FIG. 4.

More specifically, when a reading preparation request is issued from the controller layer 3, the image reading function portion 6 performs operations such as lighting the lamp 13 and setting the parameters of each operating portion, and then informs the controller layer 3 that reading preparation is complete. When reading preparation is complete throughout the entire system, the controller layer 3 issues a reading start request to the image reading function portion 6.

Having received the reading start request from the controller layer 3, the image reading function portion 6 first performs the aforementioned ADF shading operation.

Once the ADF shading operation is complete and the first traveling body 15 has reached the sheet-through reading position P1, image reading is possible, and hence the image reading function portion 6 receives an image reading request from the controller layer 3, and then, after the elapse of a standby time T shown in the following equation, where Ts is the required time for an ADF shading operation, Tl is the required time for a dirt detection operation, and Td is the time required to convey the original from the beginning of the sheet-through reading operation by the ADF 20 to the time when the tip of the original reaches the reading position, causes the ADF 20 to begin a sheet-through reading operation.

$$T=Ts+Tl-Td$$

Hence the time up to the beginning of image reading can be shortened by the required original conveyance time Td.

Thus the digital copying device 1 of this embodiment, upon reception of an image reading request from the controller layer 3, moves the first traveling body 15 to the white reference plate reading position P2 for reading the white reference plate 12, reads the white reference plate 12 to obtain shading correction data, and then performs a sheet-through shading operation (ADF shading operation) to move the first traveling body 15 to the sheet-through reading position P1 beneath the sheet-through contact glass 11. A dirt detection operation for detecting the presence of dirt on the sheet-through contact glass 11 is then performed by having the first traveling body 15 read the dirt detection reference plate 26 in the sheet-through reading position P1, whereupon the ADF 20 is driven to convey a sheet of original from the platen 21 over the sheet-through contact glass 11, whereby a sheet-through reading operation is performed to read an image of the original that is conveyed over the sheet-through contact glass 11 using the first traveling body 15 and so on fixed in the sheet-through reading position P1. When an original is to be read using this sheet-through system, the sheet-through reading operation by the ADF 20 is begun after the elapse of the standby time T=Ts+Tl−Td following the reception of an image reading request, where Ts is the required time for a sheet-through shading operation, Tl is the required time for a dirt detection operation, and Td is the time required to convey the original from the beginning of the sheet-through reading operation by the ADF 20 to the point where the tip of the original reaches the sheet-through reading position P1.

Hence reading can be started more quickly than a case in which the sheet-through reading operation is begun after the sheet-through shading operation and dirt detection operation end by the sum of the required original conveyance time Td and the required dirt detection operation time Tl (Td+tl), and as a result, the original image reading productivity can be increased while improving the quality of the read image.

When an original is to be read in the image reading function portion 6 using the sheet-through system and at a higher resolution than normal reading, the digital copying device 1 reads the original while conveying the original at a lower conveyance speed in accordance with the resolution.

Figure 5:
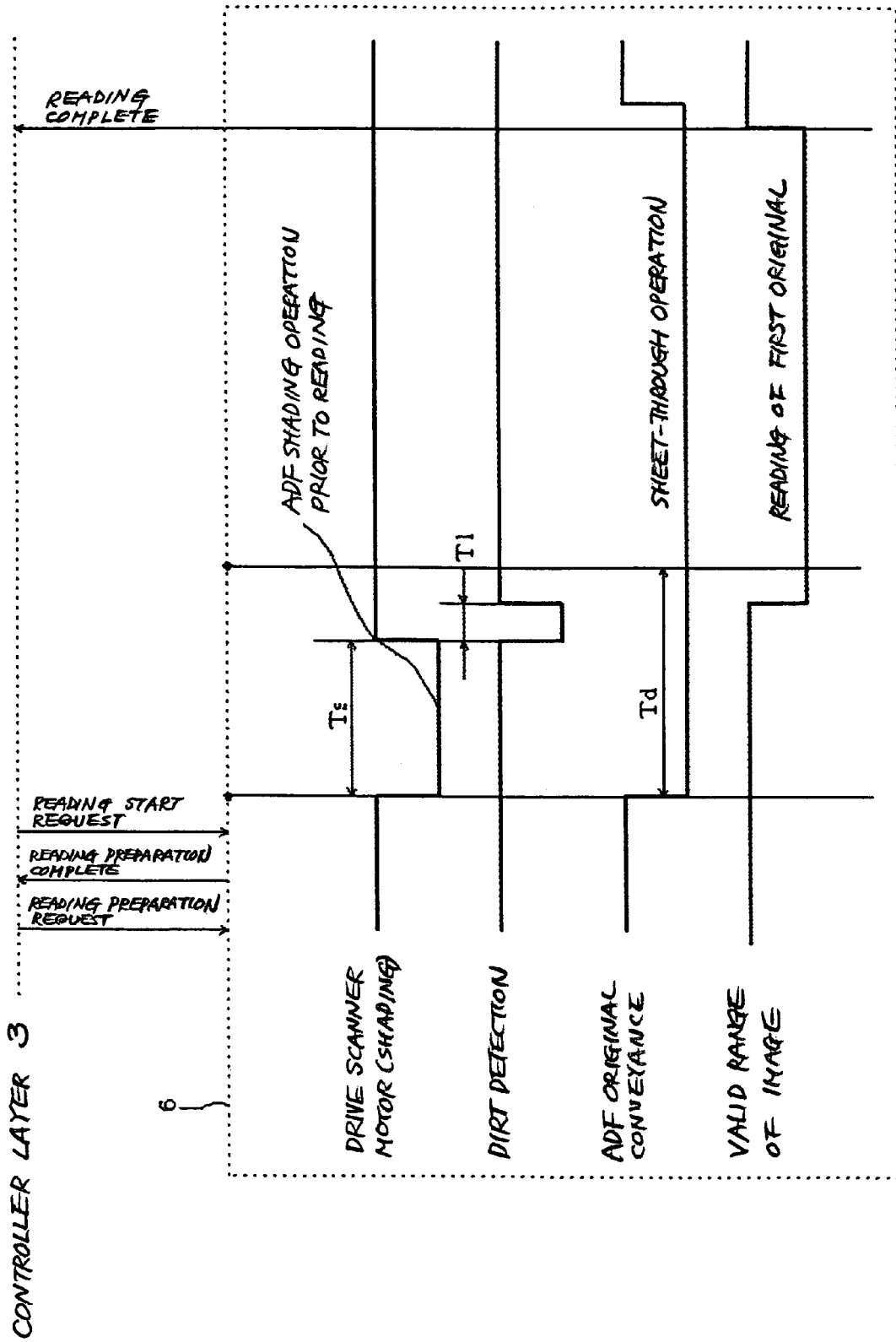
FIG. 5 is a timing chart showing the timing of a reading operation performed by the digital copying device during high-resolution reading.

In this case, in the image reading function portion 6, the required original conveyance time Td from the beginning of the sheet-through reading operation to the point where the tip of the original reaches the reading position increases, and hence, as shown in FIG. 5, the required original conveyance time Td from the beginning of the sheet-through reading operation by the ADF 20 to the point where the tip of the original reaches the reading position may become greater than the sum of the required ADF shading operation time Ts and the required dirt detection operation time Tl (Ts+Tl).

At such times, when an image reading request is received from the controller layer 3, the sheet-through reading operation is begun at the same time as the ADF shading operation, as shown in FIG. 5. In other words, when the required original conveyance time Td from the start of original conveyance to the point where the tip of the original reaches the reading position is greater than the sum Ts+Tl of the required ADF shading operation time Ts and the required dirt detection operation time Tl, the sheet-through reading operation is begun simultaneously with the beginning of the ADF shading operation. In so doing, reading can be begun more quickly by the time Ts+Tl than a case in which the sheet-through reading operation is begun after the end of the ADF shading operation.

Figure 6:
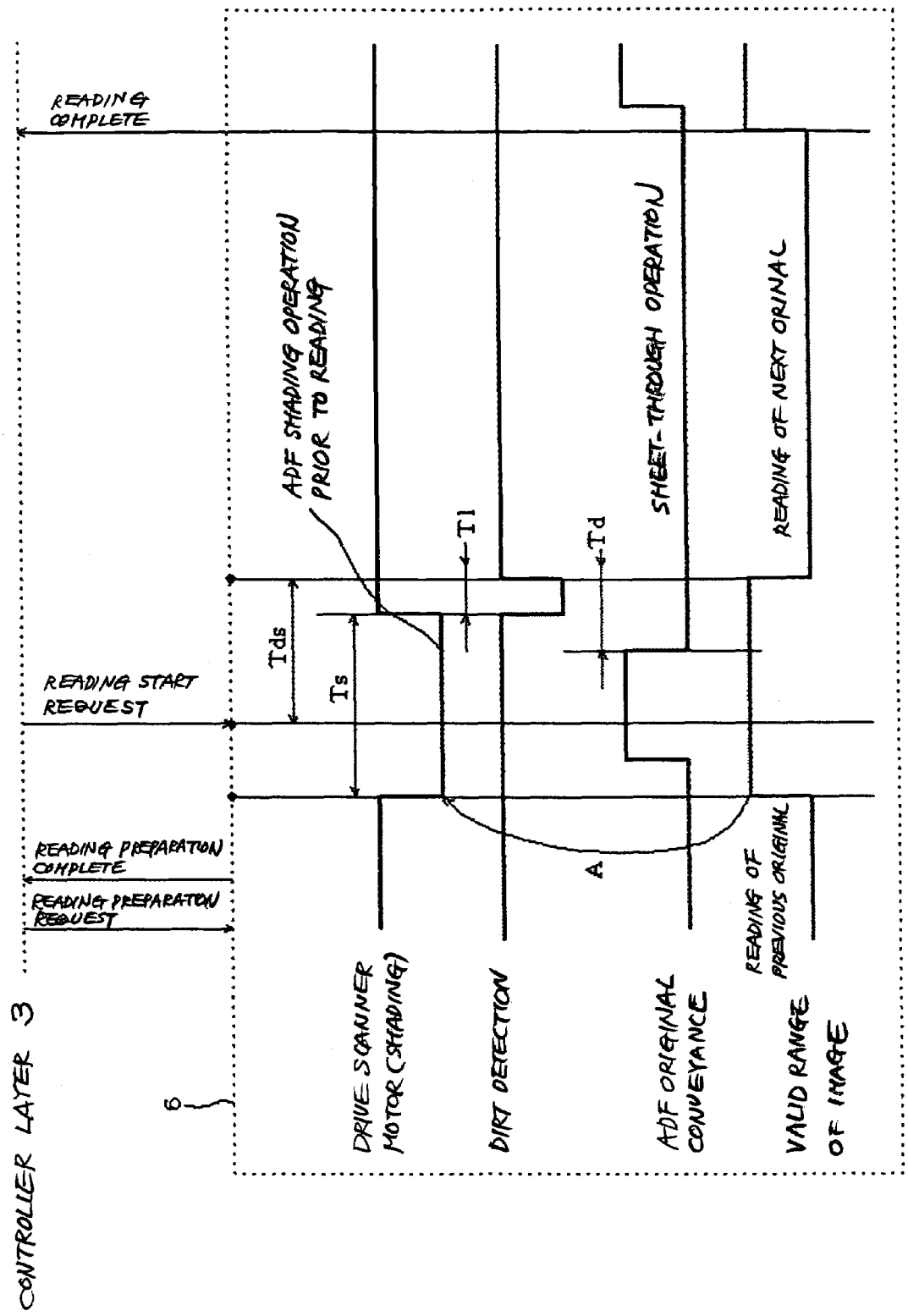
FIG. 6 is a timing chart showing the timing of a typical reading operation performed by the digital copying device from a second sheet onward when a plurality of sheets is read in series.

Further, when a plurality of originals is to be read in series in the image reading function portion 6 using the sheet-through system, the digital copying device 1 performs the control shown in FIG. 6 for reading the second original onward.

More specifically, as shown in FIG. 6, when a plurality of originals is read in series in the image reading function portion 6 using the sheet-through system, reading is performed from the second original onward such that a reading preparation request is issued from the controller layer 3 before reading of the previous original is complete, and immediately after scanning of the readable range is complete, an ADF shading operation is performed in order to read the next original, as shown by the arrow A in FIG. 6. Moreover, a timer is activated at the beginning of the ADF shading operation. Then, when a reading start request is issued from the controller layer 3, a previous operation completion time Tds from the point at which the timer is counted up to the end of the ADF shading operation and dirt detection operation is calculated. Here, if the timer count is assumed to be t, then Tds=Td+Tl−t.

Then, as shown in FIG. 6, the image reading function portion 6, having received the reading start request from the controller layer 3, begins the sheet-through reading operation after the elapse of T=Tds−Td.

Hence the reading interval per original during continuous reading can be shortened by the required original conveyance time Td.

Figure 7:
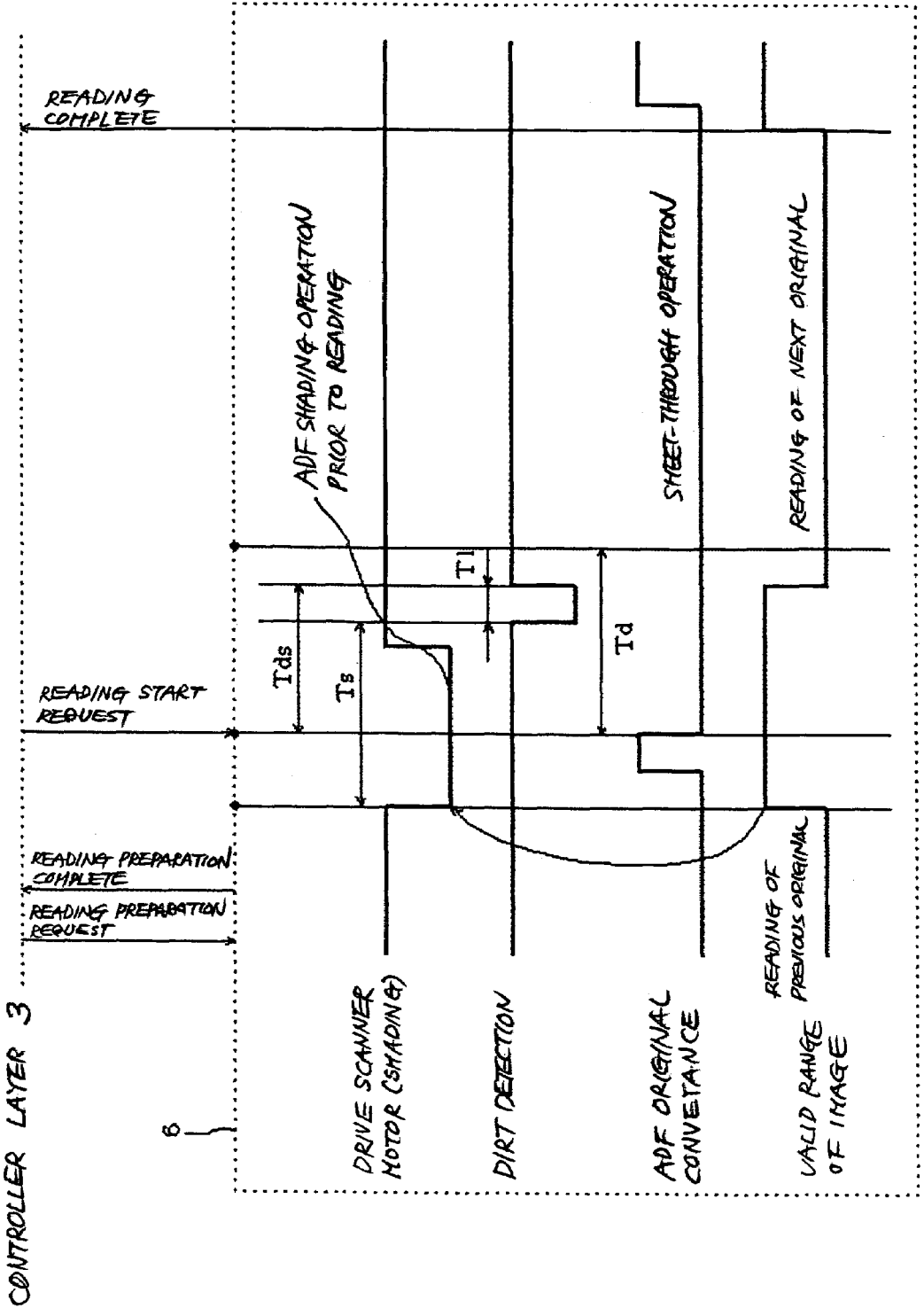

Further, when the digital copying device 1 reads a plurality of originals in series in the image reading function portion 6 using the sheet-through system, reading of the second original onward is performed such that when Tds<Td, the sheet-through reading operation is begun simultaneously with the beginning of the ADF shading operation. More specifically, in the digital copying device 1, as shown in FIG. 7, when an image reading request for the next original is not issued to the image reading function portion 6 from the controller layer 3 immediately after reading of the previous original is complete, for example in cases such as when the storage medium 5 is unable to secure a region for storing image data for reasons such as an original being read at a higher resolution than normal or a large time period being required for image output by the image output function portion 7 in relation to the time required to read a single original, the previous operation completion time Tds from the point at which the image reading request is issued to the end of the ADF shading operation and dirt detection operation becomes shorter than the required original conveyance time Td from the beginning of the sheet-through reading operation to the point at which the tip of the original reaches the image reading position. In such cases, the image reading function portion 6 begins the ADF shading operation and the sheet-through reading operation simultaneously when the image reading start request is issued, as shown in FIG. 7.

In so doing, the reading interval per original during continuous reading can be shortened by the previous operation completion time Tds in comparison with a case in which the sheet-through reading operation is begun after the shading operation and dirt detection operation end.

Further, when a plurality of originals is to be read in series, the digital copying device 1 performs the ADF shading operation described above for each original, and performs shading correction on the basis of the shading correction data obtained in the ADF shading operations.

Incidentally, shading correction is mainly for correcting irregularities in the lamp 13, and hence depending on the performance of the lamp 13, a certain degree of image quality can be ensured for a certain period of time, as long as the lamp 13 is not extinguished, by performing shading correction once rather than each time reading is performed.

Figure 8:
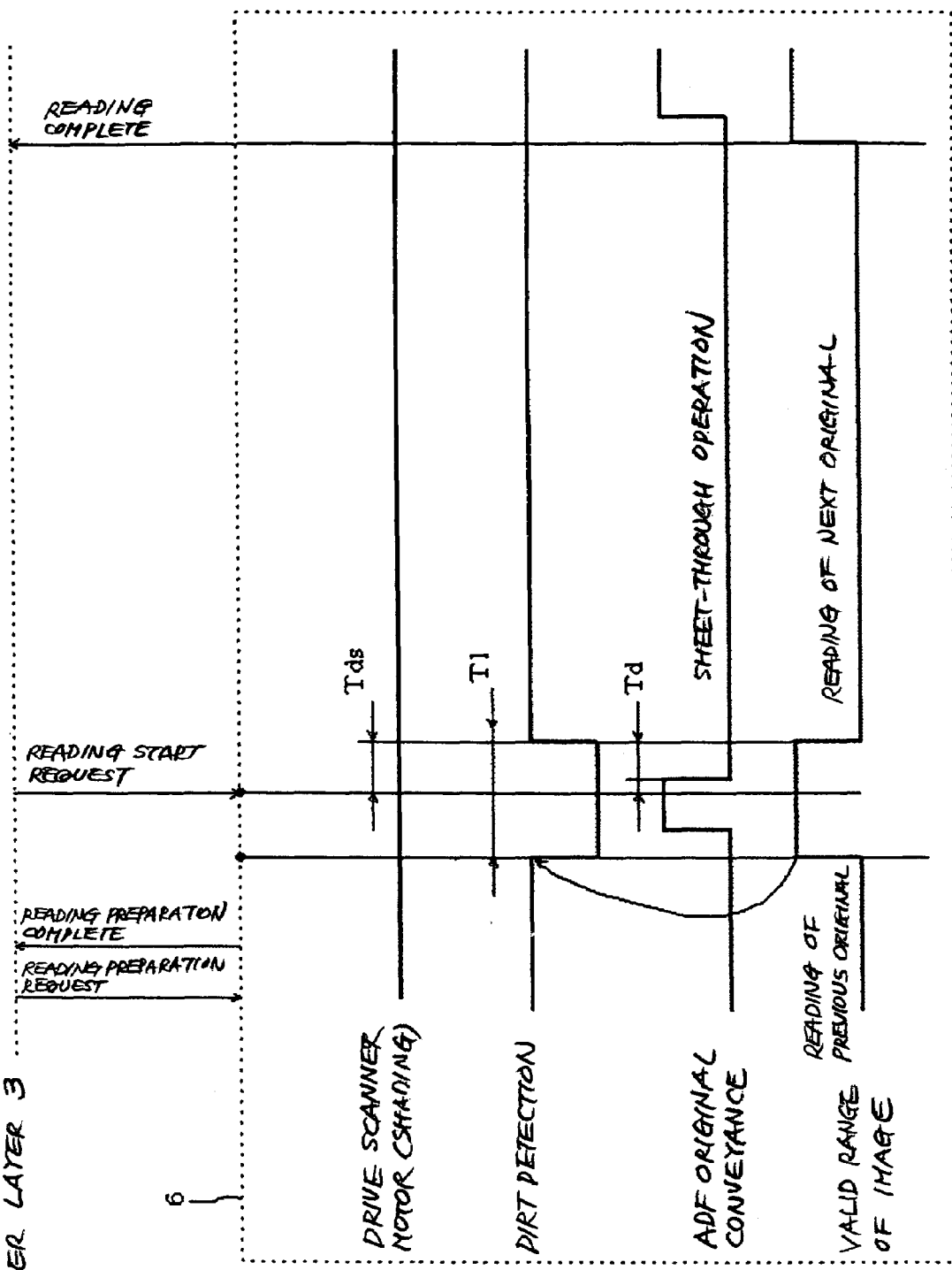
FIG. 8 is a timing chart showing the timing of a reading operation performed by the digital copying device in a case where an ADF shading operation is not performed for every original from the second sheet onward when a plurality of sheets is read in series.

Hence when there is no need for the digital copying device 1 to perform a shading operation each time an original is read to obtain shading correction data with which to perform shading correction, only a dirt detection operation, and not an ADF shading operation, is performed when reading of the previous original is complete, as shown in FIG. 8. At this time, the image reading function portion 6 calculates the previous operation completion time Tds as Tds=Tl−t, and performs a sheet-through reading operation after the elapse of T=Tds−Td following reception of a reading start request.

In so doing, the reading interval per original during continuous reading can be shortened by Td.

Figure 9:
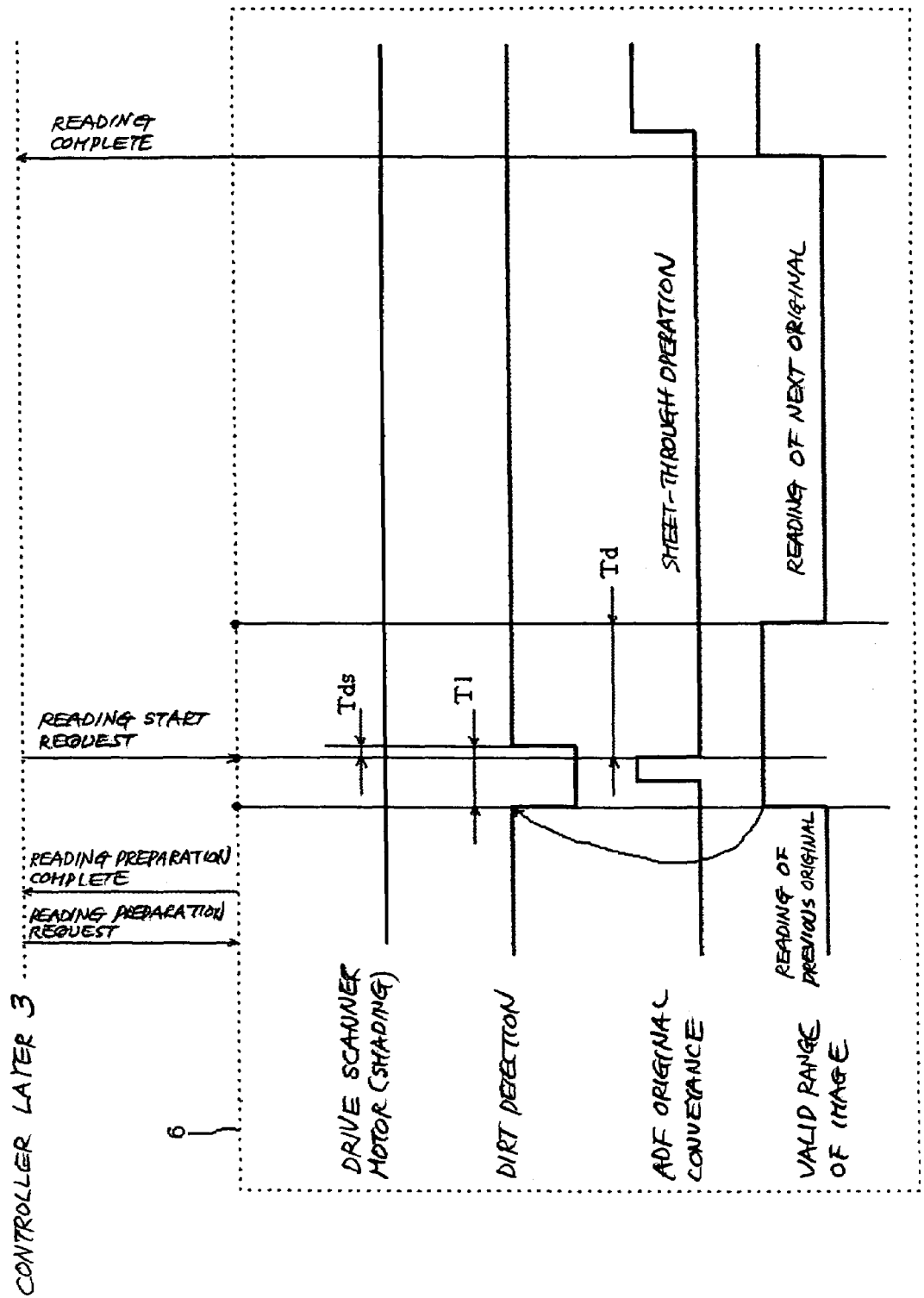
FIG. 9 is a timing chart showing the timing of a reading operation performed by the digital copying device in a case where an ADF shading operation is not performed for every original from the second sheet onward when a plurality of sheets is read in series, and where a sheet-through reading operation begins at the same time as a dirt detection operation.

Further, in cases where Tds<Td when there is no need for the digital copying device 1 to perform a shading operation each time an original is read to obtain shading correction data with which to perform shading correction, the sheet-through reading operation is begun simultaneously with the dirt detection operation. In other words, in cases where Tds<Td when there is no need to perform a shading operation each time an original is read to obtain shading correction data with which to perform shading correction, the image reading function portion 6 begins the sheet-through reading operation simultaneously with the dirt detection operation, as shown in FIG. 9.

In so doing, the reading interval per original during continuous reading can be shortened by the previous operation completion time Tds in comparison with a case in which the sheet-through reading operation is begun once the dirt detection operation is complete.

The present invention as described above comprises the following features.

(1) Reading can be started more quickly than a case in which a sheet-through reading operation is started after a sheet-through shading operation and dirt detection operation are complete by the sum of the required original conveyance time Td and the required dirt detection operation time Tl (Td+Tl), and hence the productivity of original image reading can be increased while improving the quality of the read image.

(2) Reading can be started more quickly than a case in which a sheet-through reading operation is started after a sheet-through shading operation and dirt detection operation are complete by the sum of the required sheet-through shading operation time Ts and the required dirt detection operation time Tl (Ts+Tl), and hence the productivity of original image reading can be increased while improving the quality of the read image.

(3) The reading interval per original can be shortened by the required original conveyance time Td in comparison with a case in which a sheet-through reading operation is started after a sheet-through shading operation and dirt detection operation are complete, and hence the productivity of original image reading can be increased while improving the quality of the read image.

(4) The reading interval per original can be shortened by the previous operation completion time Tds in comparison with a case in which a sheet-through reading operation is started after a sheet-through shading operation and dirt detection operation are complete, and hence the productivity of original image reading can be increased while improving the quality of the read image.

Various modifications will become possible for those skilled in the art after receiving the teachings of the present disclosure without departing from the scope thereof.

What is claimed is:

1. An image reading apparatus comprising:
    a book platen on which an original is placed;
    a sheet-through platen onto which a plurality of originals placed on an original table are conveyed sheet by sheet by a conveyor;
    a scanner disposed beneath said book platen and said sheet-through platen and configured to move in a sub scanning direction, beneath said book platen in order to read an original placed on said book platen, and configured to be positioned beneath said sheet-through platen in order to read an original that is conveyed onto said sheet-through platen;
    a white reference plate for providing shading correction data; and
    a dirt detection plate disposed facing said sheet-through platen, which is read by said scanner when no original is present on said sheet-through platen to provide detection data for detecting the presence of dirt on said sheet-through platen;

said image reading apparatus performing original reading using either a book system in which an image of the original placed on said book platen is read by having said scanner move to scan said original, or a sheet-through system in which said scanner is moved to a sheet-through reading position beneath said sheet-through platen, and an image of the original that is conveyed onto said sheet-through platen by said original conveying means is read by scanning said original using said scanner positioned in said sheet-through reading position, said white reference plate being read each time an original is read, regardless of the reading system that is used to read the original, whereupon image data obtained upon the reading of said original are subjected to shading correction based on shading correction data obtained when said white reference plate is read, wherein, when an image of an original is to be read using said sheet-through system, upon reception of an image reading request, said scanner is moved to a white reference plate reading position for reading said white reference plate, whereby said white reference plate is read by said scanner to obtain shading correction data, whereupon a sheet-through shading operation is performed to move said scanner to said sheet-through reading position beneath said sheet-through platen, whereupon a dirt detection operation for detecting the presence of dirt on said sheet-through platen is performed by having said scanner, having moved to said sheet-through reading position, read said dirt detection plate, whereupon said conveyor is driven to convey a single original from said original table onto said sheet-through platen in order to perform a sheet-through reading operation whereby an image of the original conveyed onto said sheet-through platen is read using said scanner positioned in said sheet-through reading position, and when an original is to be read using said sheet-through system in accordance with said image reading request, said sheet-through reading operation is begun by said conveyor after the elapse of a standby time $T=Ts+Tl-Td$, where Ts is a time required for said sheet-through shading operation, Tl is a time required for said dirt detection operation, and Td is a time required to convey the original from the start of said sheet-through reading operation by said conveyor to the time when a tip of the original reaches said sheet-through reading position, following reception of said image reading request.

2. The image reading apparatus as claimed in claim 1, wherein, when said required original conveyance time Td is greater than the sum of said required sheet-through shading operation time Ts and said required dirt detection operation time Tl, said sheet-through shading operation and said sheet-through reading operation are started together upon reception of said image reading request.

3. The image reading apparatus as claimed in claim 1, wherein, when a plurality of originals is to be read in series using said sheet-through system, from the reading of the second original onward said sheet-through reading operation is started by said conveyor following the reception of said image reading request and after the elapse of a standby time $T=Tds-Td$, where Tds is a previous operation completion time from reception of said image reading request to the completion of said sheet-through shading operation and said dirt detection operation, which were started immediately after the completion of reading of the previous original.

4. The image reading apparatus as claimed in claim 3, wherein, when said required original conveyance time Td is greater than said previous operation completion time Tds, said sheet-through reading operation is started upon reception of said image reading request.

5. The image reading apparatus as claimed in claim 3, wherein, when said original is read without performing said sheet-through shading operation, said sheet-through reading operation is started by said conveyor after the elapse of the standby time $T=Tds-Td$ following the reception of said image reading request.

6. The image reading apparatus as claimed in claim 5, wherein, when said required original conveyance time Td is greater than said previous operation completion time Tds, said sheet-through reading operation is started upon reception of said image reading request.

* * * * *